United States Patent
Boykin et al.

(10) Patent No.: US 7,434,215 B2
(45) Date of Patent: Oct. 7, 2008

(54) MECHANISM FOR LOADING PLUGIN CLASSES AT AN APPROPRIATE LOCATION IN THE CLASS LOADER HIERARCHY

(75) Inventors: James Russell Boykin, Pflugerville, TX (US); Alberto Giammaria, Austin, TX (US); Brian Joseph Schlosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 10/660,014

(22) Filed: Sep. 11, 2003

(65) Prior Publication Data

US 2005/0060698 A1    Mar. 17, 2005

(51) Int. Cl.
*G06F 9/44* (2006.01)
*G06F 9/445* (2006.01)
*G06F 12/00* (2006.01)

(52) U.S. Cl. ............. 717/169; 717/175; 717/147; 717/148; 718/1; 711/6

(58) Field of Classification Search ........... 717/106–19, 717/116, 118, 146–148, 168–178; 719/331–332; 718/1; 711/6
See application file for complete search history.

(56) References Cited

U.S. PATENT DOCUMENTS

| | | | |
|---|---|---|---|
| 6,216,152 B1 | 4/2001 | Wong et al. | 709/203 |
| 6,513,158 B1 | 1/2003 | Yogaratnam | 717/166 |
| 7,039,923 B2* | 5/2006 | Kumar et al. | 719/331 |
| 2002/0184226 A1* | 12/2002 | Klicnik et al. | 707/100 |
| 2004/0015936 A1* | 1/2004 | Susarla et al. | 717/166 |
| 2007/0019897 A1* | 1/2007 | Gauthier et al. | 385/12 |

OTHER PUBLICATIONS

Liang; Bracha "Dynamic Class Loading in the Java Virtual Machine", 1998, ACM OOPSLA '98, pp. 36-44.*

* cited by examiner

*Primary Examiner*—Lewis A. Bullock, Jr.
*Assistant Examiner*—Jason Mitchell
(74) *Attorney, Agent, or Firm*—Duke W. Yee; Jeffrey S. LaBaw; James O. Skarsten

(57) ABSTRACT

A set of plug-in class loaders is provided in the class loader hierarchy. A plug-in class loader is provided for each class loader in the plug-in application's class loader hierarchy. Each plug-in class loader is associated with a single application class loader and is configured such that it delegates to its associated application class loader. All plug-in class loaders are also configured with a class path such that they may load plug-in classes from a directory that is specified within a configuration file. The loading of all plug-in classes is initiated by the application using the plug-in class loaders.

17 Claims, 7 Drawing Sheets

MECHANISM FOR LOADING PLUGIN CLASSES AT AN APPROPRIATE LOCATION IN THE CLASS LOADER HIERARCHY

BACKGROUND OF THE INVENTION

1. Technical Field

The present invention relates to data processing and, in particular, to class loaders in a Java virtual machine. Still more particularly, the present invention provides a method, apparatus, and program for loading plug-in classes at an appropriate location in the class loader hierarchy.

2. Description of Related Art

Many applications allow functionality to be extended through plug-ins. For example, a Web server application may be extended with an encryption plug-in. Plug-ins are application extensions that are registered to the application through a registry or configuration file. It is the job of the application to load the appropriate plug-ins and invoke them at the appropriate times during the application life cycle.

In environments where a class loader is used to load a class (i.e. Java), the application must determine which class loader to use to initiate the loading of the plug-in classes. If the application uses the class loader that loaded the application classes to initiate the loading of the plug-in classes, this can pose several problems. To use the application's class loader structure to load plug-in classes may require the class path to be modified such that the application class loader can load the plug-in classes. This may be difficult to accomplish due to various factors, such as security, customized class loaders, and remote location of classes.

Furthermore, the manner in which the class path can be modified varies from application to application, and even within the application depending on the class loader that is used. There is no generic manner in which any or all class loaders can be configured to load the plug-in classes. Yet another problem can be encountered if the class loader delegation model is properly followed by the application's class loaders and multiple different class loaders are used to load application classes.

Therefore, it would be advantageous to provide an improved mechanism for loading plug-in classes at an appropriate location in the class loader hierarchy.

SUMMARY OF THE INVENTION

The present invention provides a set of plug-in class loaders in the class loader hierarchy. A plug-in class loader is provided for each class loader in the plug-in application's class loader hierarchy. Each plug-in class loader is associated with a single application class loader and is configured such that it delegates to its associated application class loader. All plug-in class loaders are also configured with a class path such that they may load plug-in classes from a directory that is specified within a configuration file. The loading of all plug-in classes is initiated by the application using the plug-in class loaders.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a mechanism for an application to initiate loading of plug-in classes at appropriate locations within a class loader hierarchy within a virtual machine. The mechanisms of the present invention may be employed in a computing device, such as a stand-alone computer, a client device, or a server. The mechanisms of the present invention may also be employed within a Java Runtime Environment using a Java Virtual Machine. As such, in order to provide a context for the description of the operational components of the present invention, a brief description of a data processing system is provided hereafter with reference to FIGS. 1 and 2. A brief description of a Java Runtime Environment and, more particularly, a Java Virtual Machine is provided with reference to FIGS. 3 and 4.

Figure 1:
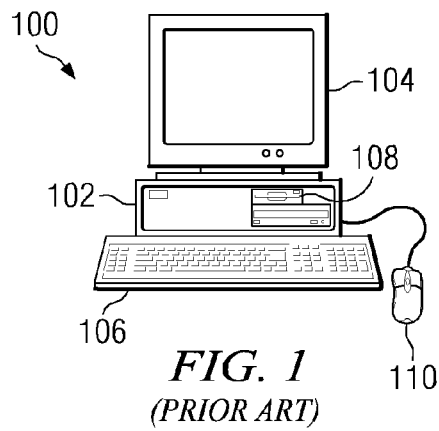
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
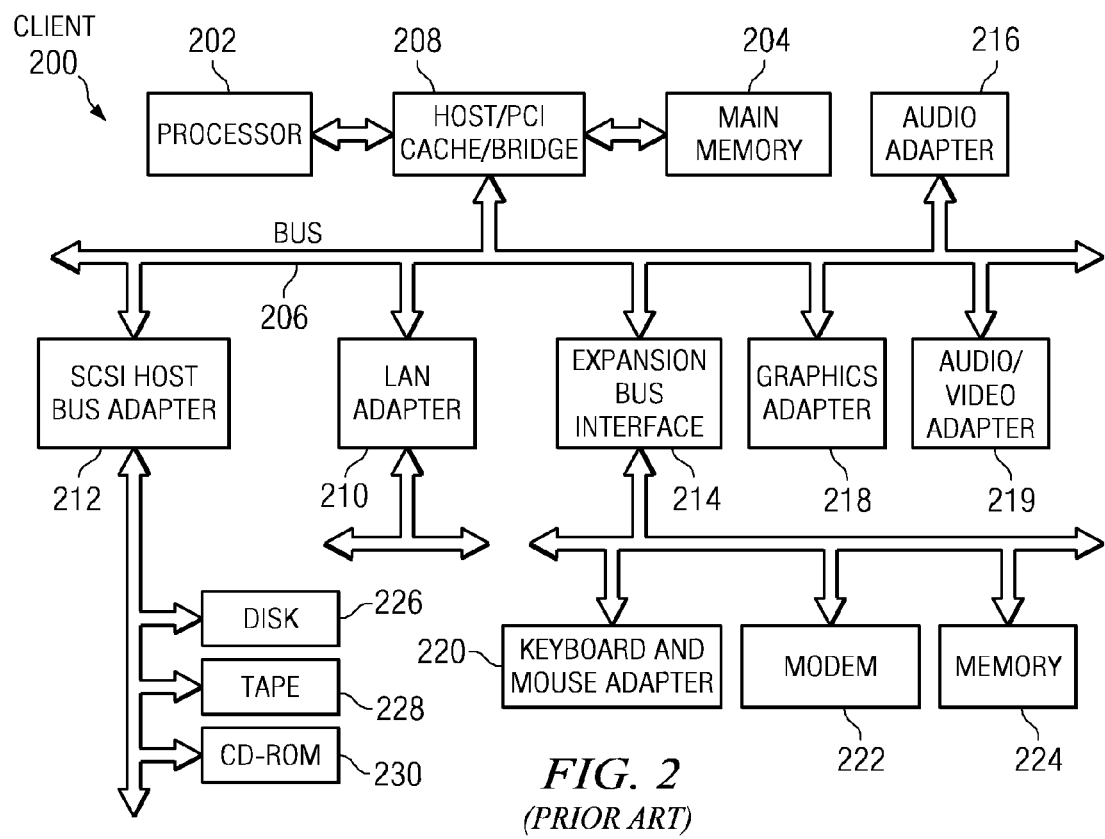
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards.

In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
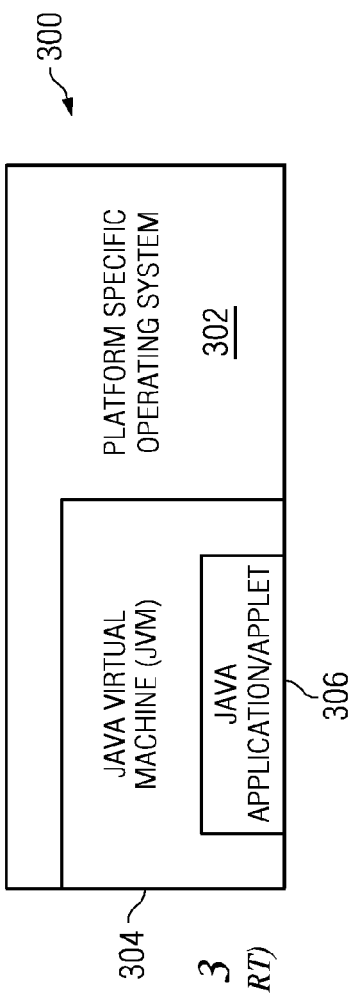
FIG. 3 is a block diagram illustrating the relationship of software components operating within a computer system that may implement the present invention.

With reference now to FIG. 3, a block diagram illustrates the relationship of software components operating within a computer system that may implement the present invention. Java-supporting system 300 contains platform specific operating system 302 that provides hardware and system support to software executing on a specific hardware platform. Java virtual machine (JVM) 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded pico-Java core.

At the center of a Java run-time environment is the JVM, which supports all aspects of Java's environment, including its architecture, security features, mobility across networks, and platform independence. The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures.

To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A JVM loads class files and executes the bytecodes within them. The class files are loaded by a class loader in the JVM. A class loader loads class files from an application and the class files from the Java application programming interfaces (APIs), which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4:
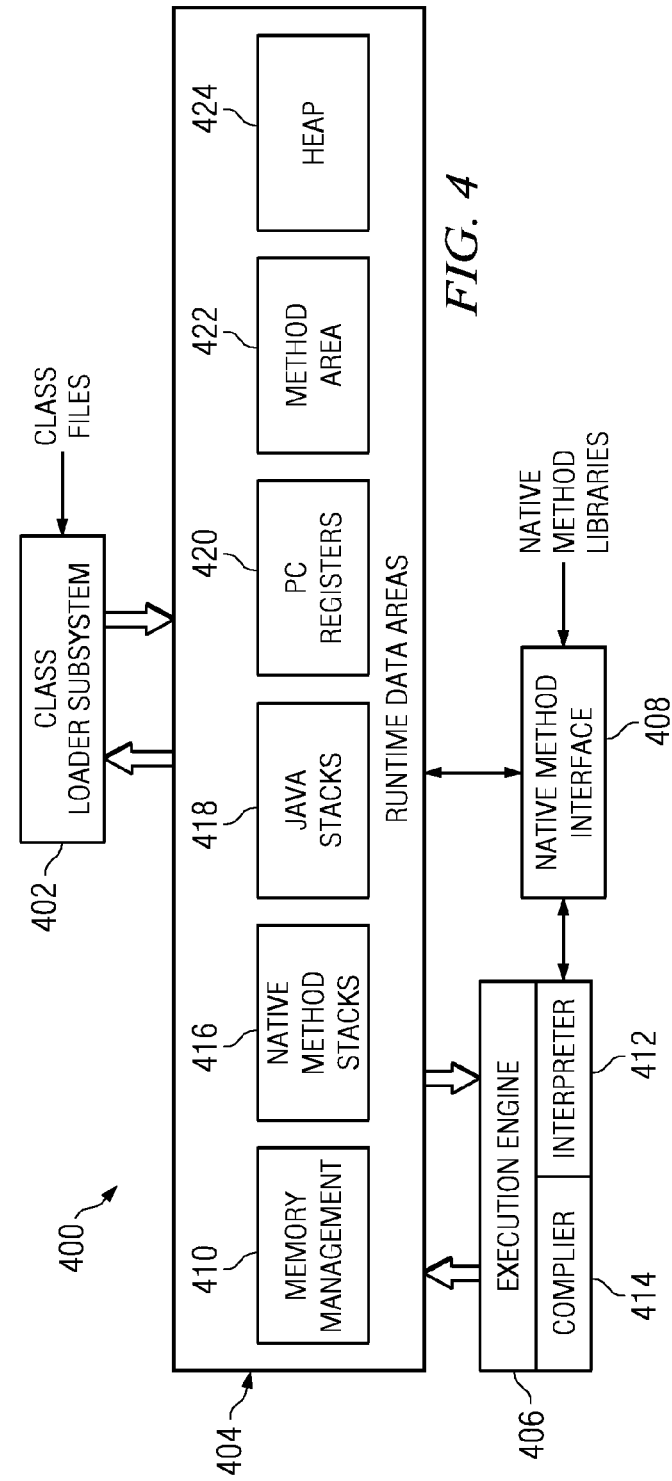
FIG. 4 is a block diagram of a JVM in accordance with a preferred embodiment of the present invention.

With reference now to FIG. 4, a block diagram of a JVM is depicted in accordance with a preferred embodiment of the present invention. JVM 400 includes a class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, a Java native interface. Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations.

Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

PC registers 420 are used to indicate the next instruction to be executed. Each instantiated thread gets its own PC register (program counter) and Java stack. If the thread is executing a JVM method, the value of the pc register indicates the next instruction to execute. If the thread is executing a native method, then the contents of the pc register are undefined.

Native method stacks 416 store the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The JVM specification strictly defines data types and operations. Most JVMs choose to have one method area and one heap, each of which are shared by all threads running inside the JVM. When the JVM loads a class file, it parses information about a type from the binary data contained in the class file. It places this type information into the method area.

Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

In environments where a class loader is used to load a class (i.e. Java), the application must determine which class loader to use to initiate the loading of plug-in classes. If the application uses the class loader that loaded the application classes to initiate the loading of the plug-in classes, this can pose several problems. To use the application's class loader structure to load plug-in classes may require the class path to be modified such that the application class loader can load the plug-in classes. This may be difficult to accomplish due to various factors, such as security, customized class loaders, and remote location of classes.

Furthermore, the manner in which the class path can be modified varies from application to application, and even within the application depending on the class loader that is used. There is no generic manner in which any or all class loaders can be configured to load the plug-in classes. For example, to modify the class path for the boot class loader, the Java system property "sun.boot.class.path" must be modified. To modify the class path for the extension class loader, the Java system property "java.ext.dirs" must be modified. And to modify the class path for the system class loader, the Java system property "java.class.path" must be modified. There is no standard mechanism to modify the class path for any application specific class loaders and there may not even be a mechanism available if the application uses non-configurable hard coded information to create the class path.

Figure 5A:
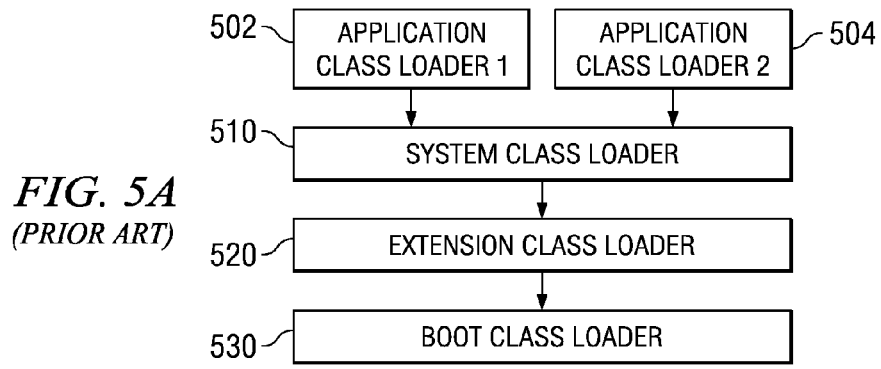
FIGS. 5A-5C are block diagrams illustrating examples of a class loader delegation model.
Figure 5B:
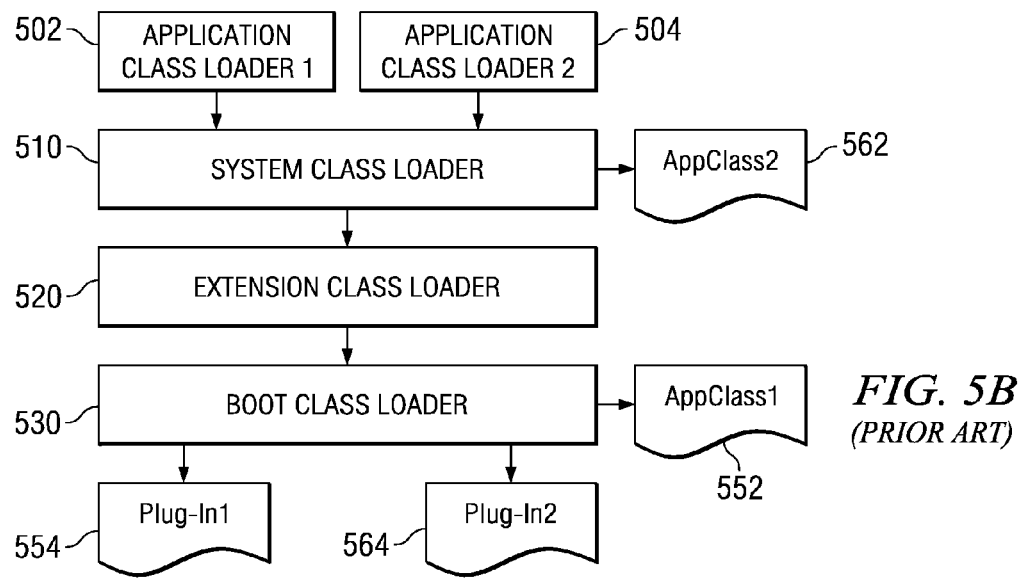
Figure 5C:
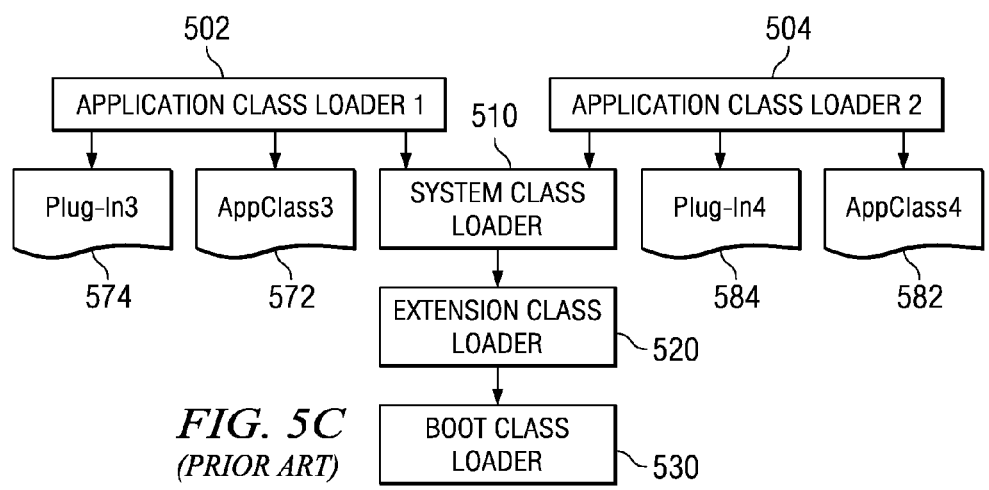

FIGS. 5A-5C are block diagrams illustrating examples of a class loader delegation model. More particularly, FIG. 5A illustrates an example with application class loader 1 502 and application class loader 2 504. Application class loader 1 and application class loader 2 delegate to system class loader 510. Similarly, the system class loader delegates to extension class loader 520 and, in turn, the extension class loader delegates to boot class loader 530. At best, system class loader 510, extension class loader 520, and boot class loader 530 can be reliably configured to load plug-in classes.

Another problem may be encountered if the class loader delegation model is properly followed by the application's class loaders and multiple different class loaders are used to load application classes. If, for example, there are two classes within an application that can call plug-ins, one loaded by the system class loader and the other by the boot class loader, then both the system class loader and the boot class loader must be configured to be able to load the plug-in classes. If such is the case, then the boot class loader will always be the one to load the plug-in classes, since the system class loader will delegate to the boot class loader.

This poses no problems for the plug-ins running for the application class that was loaded by the boot class loader; however, it poses problems for the plug-ins running for the application class that was loaded by the system class loader. Since a class can only have direct access to the classes that were loaded by its class loader and its class loader's parents, the plug-ins that run for the application class loaded by the system class loader will not have the ability to directly reference any of the application classes that were loaded by a class loader higher up in the hierarchy than the boot class loader. The plug-ins can still reference the application classes indirectly through reflection; however, this makes the plug-in code very difficult to understand and maintain.

FIG. 5B illustrates the problems associated with the common class loader hierarchy. The plug-in, Plug-In1 554, for class AppClass1 552 is loaded by the boot class loader and can directly access all classes to which AppClass1 has access. The plug-in, Plug-In2 564, for class AppClass2 562 is loaded by the boot class loader, since AppClass2 was loaded by the system class loader and the system class loader delegates to the extension class loader, which in turn delegates to the boot class loader. However, the Plug-In2 class 564 cannot access the class AppClass2 directly, since AppClass2 was loaded at a higher level in the class loader hierarchy.

FIG. 5C illustrates problems associated with plug-in classes sharing data when the plug-in classes are used by multiple application classes that are loaded for different application class loaders. Since class AppClass3 572 is loaded by application class loader 1 502, the plug-in class, Plug-In3 574, is also loaded by application class loader 1. Similarly, since class AppClass4 582 is loaded by application class loader 2 504, the plug-in class, Plug-In4 584, is also loaded by application class loader 2. Since Plug-In3 and Plug-In4 are loaded by different application class loaders, plug-in class Plug-In3 cannot share data with class Plug-In4. Furthermore, the application cannot dynamically load new plug-in classes without requiring the application to be restarted.

To solve the above mentioned problems, the present invention provides a set of plug-in class loaders in the class loader hierarchy. A plug-in class loader is provided for each class loader in the class loader hierarchy. Each plug-in class loader is associated with a single application class loader and is configured such that it delegates to its associated application class loader. All plug-in class loaders are also configured with a class path such that they can load plug-in classes from a directory that is specified with a configuration file. The loading of all plug-in classes is initiated by the application using the plug-in class loaders. Plug-in classes may then be loaded either by the plug-in class loader itself or by one of the existing application class loaders to which the initiating plug-in class loader delegates.

Figure 6A:
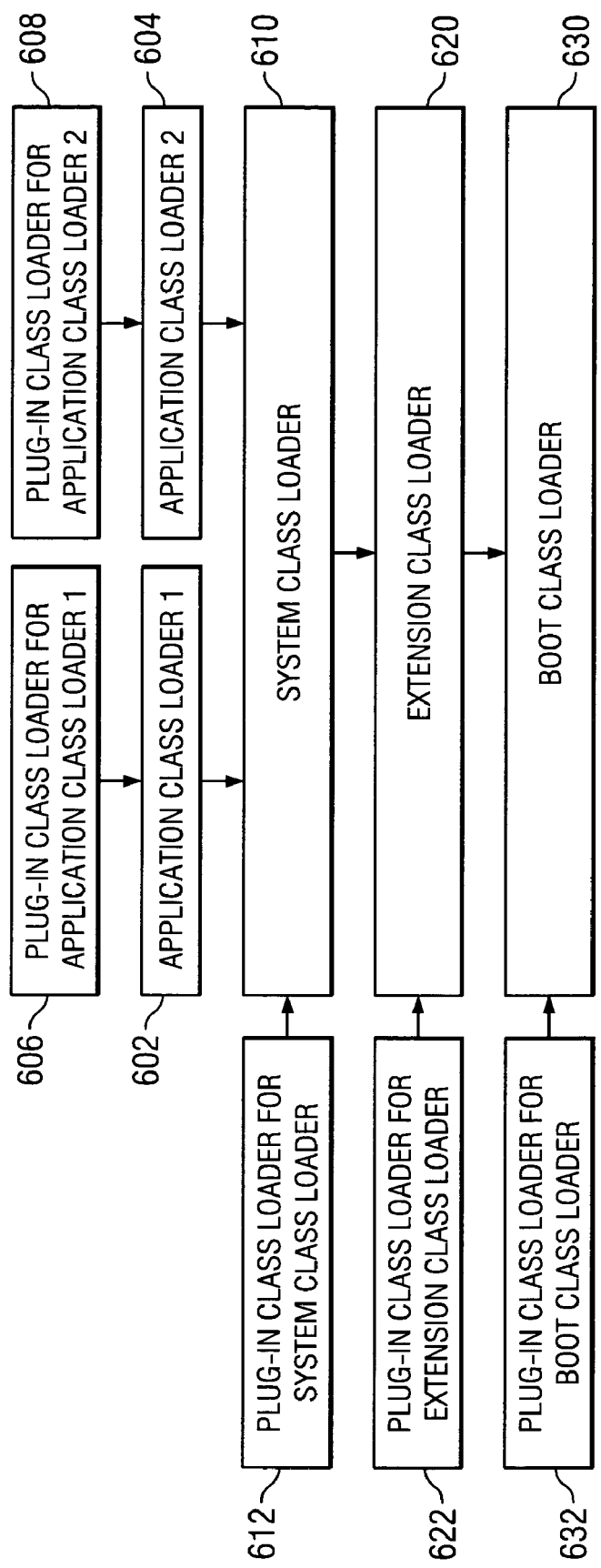
FIGS. 6A-6C are block diagrams illustrating examples of a class loader hierarchy in accordance with a preferred embodiment of the present invention.
Figure 6B:
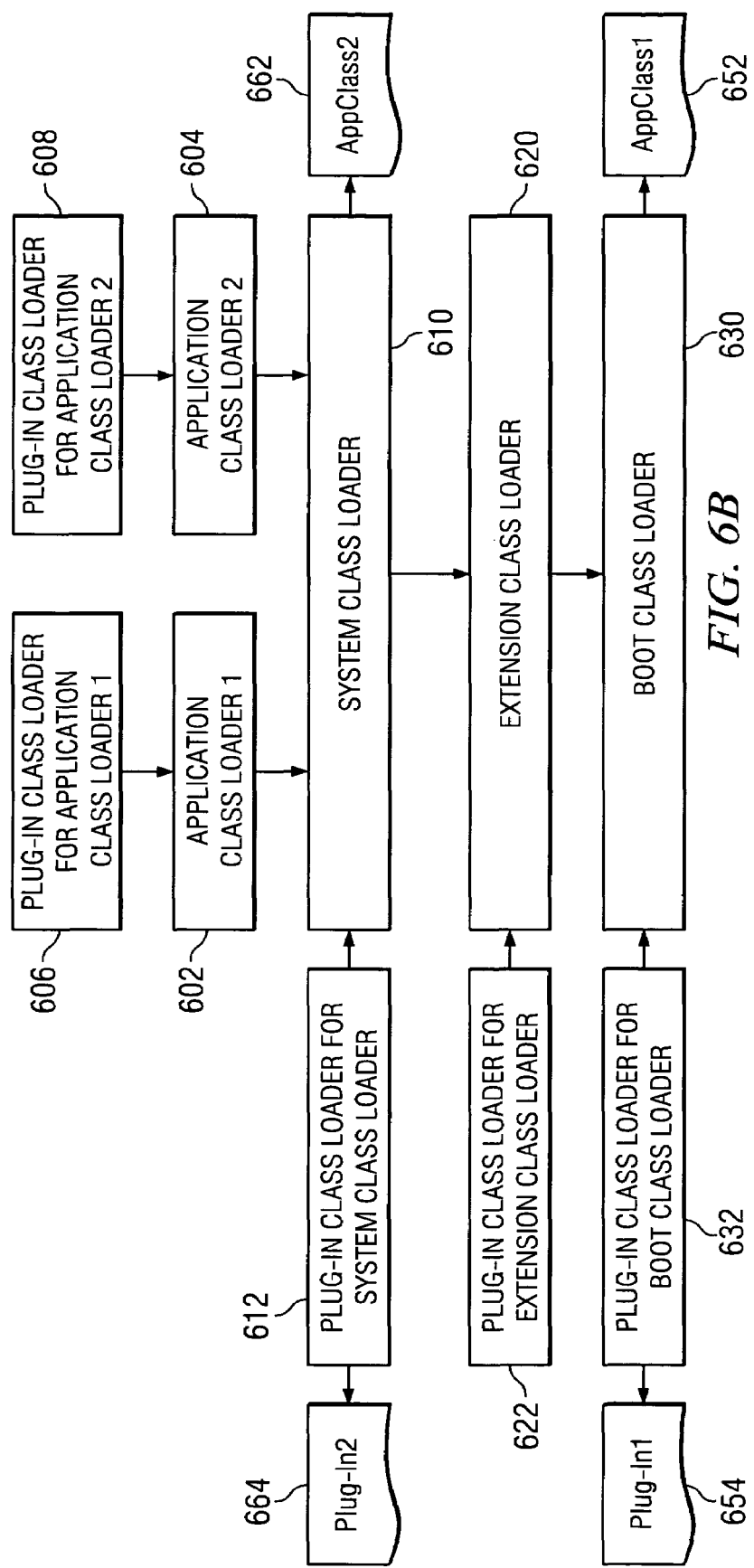
Figure 6C:
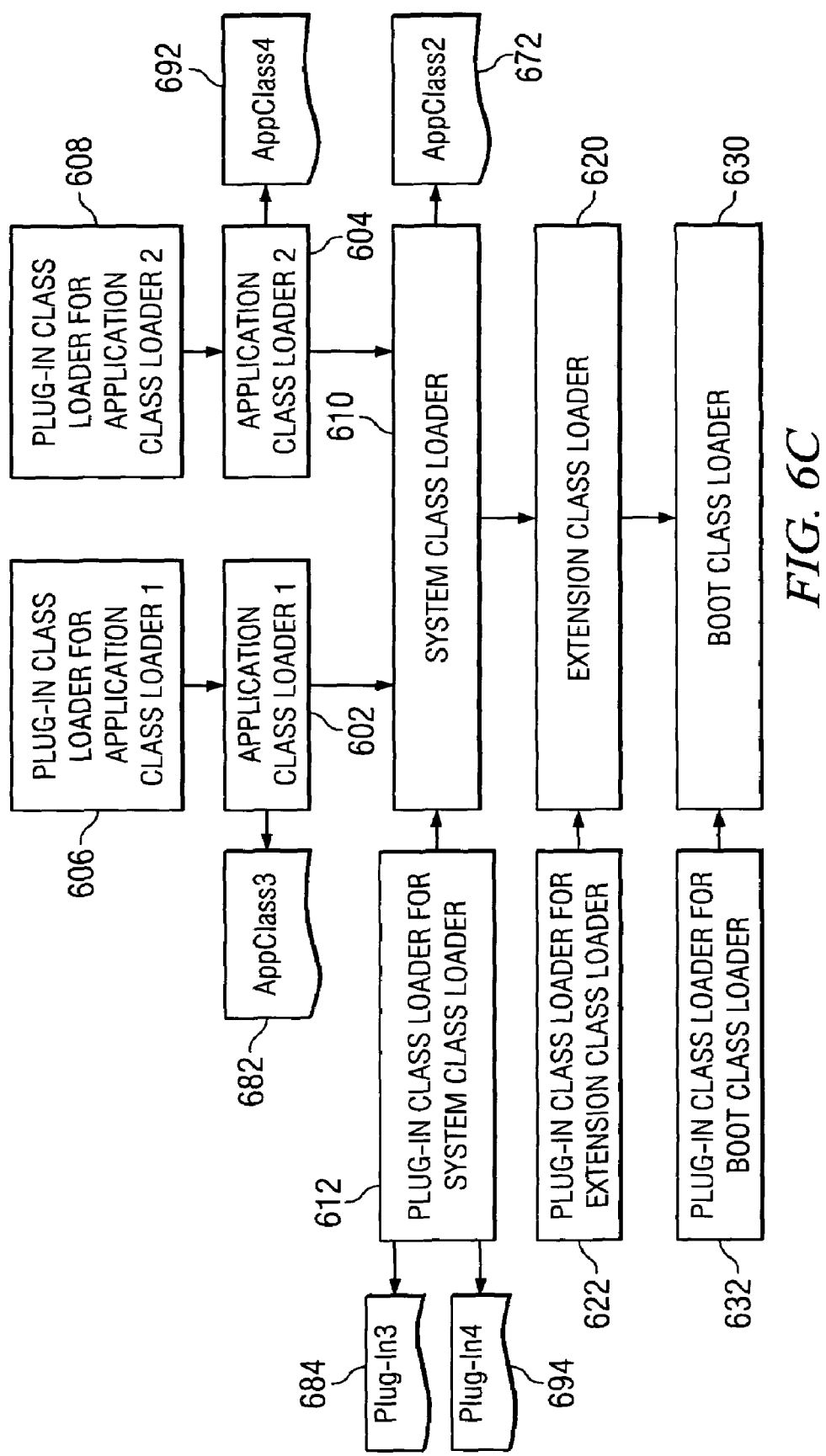

FIGS. 6A-6C are block diagrams illustrating examples of a class loader hierarchy in accordance with a preferred embodiment of the present invention. More particularly, FIG. 6A illustrates an example with application class loader 1 602 and application class loader 2 604. Application class loader 1 and application class loader 2 delegate to system class loader 610. Similarly, the system class loader delegates to extension class loader 620 and, in turn, the extension class loader delegates to boot class loader 630. At best, system class loader 610, extension class loader 620, and boot class loader 630 can be reliably configured to load plug-in classes.

As stated above, the present invention provides a plug-in class loader for each existing application class loader. Plug-in class loader 606 is provided for and delegates to application class loader 1 602. Plug-in class loader 608 is provided for and delegates to application class loader 2 604. Similarly, plug-in class loader 612 is provided for and delegates to system class loader 610; plug-in class loader 622 is provided for and delegates to extension class loader 620; and, plug-in class loader 632 is provided for and delegates to boot class loader 630.

An application class uses the plug-in class loader that delegates to the application class loader that loaded the application class to initiate the loading of plug-in classes. To accomplish this, the present invention maintains a mapping of each application class loader to its associated plug-in class loader.

FIG. 6B illustrates the loading of plug-in classes by application classes using the loading class hierarchy of the present invention. The application class AppClass1 652 is loaded by the boot class loader. Therefore, when the application class loads plug-in class Plug-In1 654, AppClass1 uses the plug-in class loader that delegates to the boot class loader to initiate the loading of Plug-In1. Similarly, since the application class AppClass2 662 is loaded by the system class loader, AppClas2 uses the plug-in class loader that delegates to the system class loader to initiate the loading of the plug-in class, Plug-In2 664.

This solution does not require any modification to any of the existing application's class paths. The class loaders of the present invention simply require one configuration value to be specified in the application configuration file to provide the path where the plug-in class loaders should look for plug-in classes. The class loader hierarchy of the present invention provides a generic manner in which any application can be configured to load plug-in classes.

Also, since the previously existing class loader hierarchy need not be utilized to load the plug-in classes, the loading of a plug-in class Plug-In2, for example, can be performed by the plug-in class loader for the system class loader and the Plug-In2 class has direct access to all classes to which the application class AppClass2 has access. This eliminates the need for reflection in the plug-in classes.

An application class may also be configured such that a specific plug-in class loader is targeted to be used to load a plug-in class. A configuration file may be modified such that a plug-in class is specified to be loaded at any point at or below the application class in the application class loader hierarchy. The load point is specified by providing the name of another class that would be loaded by the desired class loader. By allowing for plug-in classes to be loaded at a different context, data can be easily shared by different plug-ins by specifying that the application should load them at a common context.

FIG. 6C illustrates loading plug-in classes at a particular context in accordance with a preferred embodiment of the present invention. The application class AppClass2 672 is loaded by the system class loader 610. AppClass3 682 is loaded by application class loader 1 602 and AppClass4 692 is loaded by application class loader 2 604. Both plug-in classes, Plug-In3 684 associated with AppClass3 682 and Plug-In4 694 associated with AppClass4 692, are specified to use the class loader of AppClass2. This specification may be made in the application classes using a property, such as a "useClassLoaderOf" property.

Both Plug-In3 and Plug-In4 are loaded by the plug-in class loader of the system class loader, because the system class loader was used to load AppClass2. Since Plug-In3 and Plug-In4 are both loaded by the same class loader in the same context, these two plug-in classes are able to share data. Therefore, the plug-in classes need not construct an alternate mechanism to obtain an object handle to an object or class loaded by an alternate class loader.

However, to use this mechanism to share data, the plug-in classes can no longer have direct access to the application classes that were loaded at the level of AppClass3 and App-Class4. Therefore, the plug-in classes must use reflection to access their corresponding application classes.

The plug-in class loaders load plug-in classes from the directory specified in the application configuration file in the plug-in directory, as well as all archive and compressed files associated with that directory. The plug-in class loaders support dynamic updating of their class path. Therefore, if any additional archive or compressed files are added to the plug-in directory, the plug-in class loaders will dynamically update their class path to add the new files. The plug-in class loaders will also be able to load plug-in classes from the directory without requiring the application to be restarted. As new files are added and the class path is updated, the plug-in class loaders share a single class path across all instances of the plug-in class loaders to ensure that if multiple different application classes invoke the same plug-in, those plug-in instances are defined using the same class data.

Figure 7:
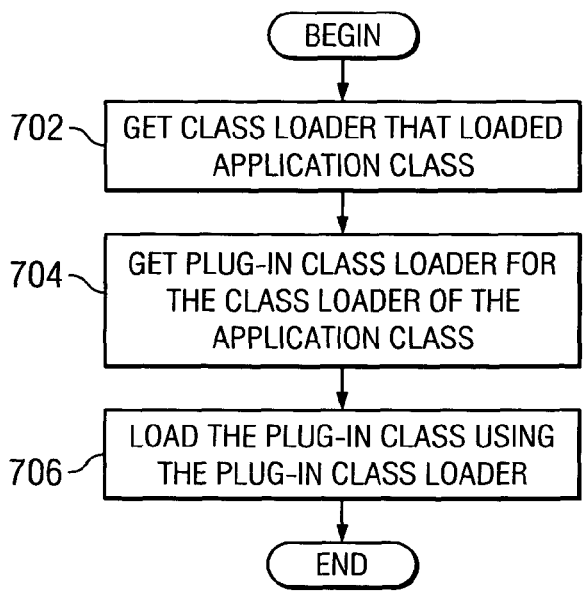
FIG. 7 is a flowchart illustrating the operation of an application initiating the loading of a plug-in class in accordance with a preferred embodiment of the present invention.

With reference to FIG. 7, a flowchart is shown illustrating the operation of an application initiating the loading of a plug-in class in accordance with a preferred embodiment of the present invention. The process begins and the application gets the class loader that loaded the application class (step 702). Then, the application gets the plug-in class loader for the class loader of the application class (step 704). Finally, the application loads the plug-in class using the identified plug-in class loader (step 706) and the process ends.

Figure 8:
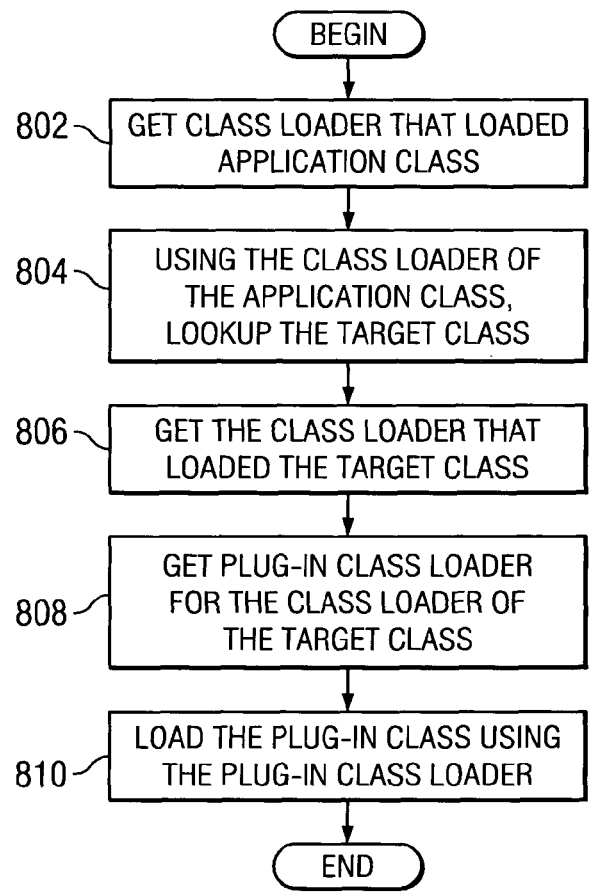
FIG. 8 is a flowchart illustrating the operation of an application initiating the loading of a plug-in class in a specific context in accordance with a preferred embodiment of the present invention.

Turning to FIG. 8, a flowchart illustrating the operation of an application initiating the loading of a plug-in class in a specific context is shown in accordance with a preferred embodiment of the present invention. The process begins and the application gets the class loader that loaded the application class (step 802). Then, using the class loader of the application class, the application looks up a target class (step 804). The application then gets the class loader that loaded the target class (step 806) and gets the plug-in class loader for the class loader of the target class (step 808). Thereafter, the application loads the plug-in class using the identified plug-in class loader (step 810) and the process ends.

Thus, the present invention solves the disadvantages of the prior art by providing a set of plug-in class loaders in a virtual machine. A plug-in class loader is provided for each class loader in the plug-in application's class loader hierarchy. Each plug-in class loader is associated with a single application class loader and is configured such that it delegates to its associated application class loader. Thus, the present invention provides a generic mechanism for any application to load plug-in classes at an appropriate level in the class loader hierarchy.

Also, all plug-in class loaders may be configured with a class path such that they may load plug-in classes from a directory that is specified within a configuration file. Therefore, the class loader hierarchy and exemplary aspects of the present invention allow new plug-in classes to be registered at runtime without requiring the application to restart.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selecting a class loader to load a plug-in class within a class loader hierarchy, the method comprising the steps of:

generating a class loader hierarchy comprising a plurality of class loaders that includes two or more application class loaders, one for each of two or more application classes, wherein each of said application class loaders can selectively load its application class, or delegate the loading of its application class to another class loader of said class loader hierarchy;

providing a different plug-in class loader for each class loader of said class loader hierarchy, wherein each plug-in class loader is associated with only a single class loader of said hierarchy, and wherein each plug-in class loader is associated with the single class loader in that it delegates to its associated class loader;

identifying the class loader of said hierarchy that is used to load a specified one of said two or more application classes;

configuring a first application class to load a first plug-in class using a target class, wherein the name of the target class is specified in a configuration file and the target class resides at a point at or below the application class in the application class loader hierarchy;

identifying a target class loader within the class loader hierarchy that loaded the target class;

identifying a plug-in class loader that is associated with and delegates to the target class loader; and loading the first plug-in using the identified plug-in class loader.

2. The method of claim 1, wherein an application file is associated with said plug-in classes, and said plug-in class loader that is associated with said identified class loader is enabled to locate said given plug-in class by specifying a single configuration value in said application file.

3. The method of claim 2, wherein the plurality of class loaders includes an extension class loader, wherein the extension class loader delegates to a boot class loader.

4. The method of claim 3, wherein the plurality of class loaders includes a system class loader, wherein the system class loader delegates to the extension class loader.

5. The method of claim 4, wherein the two or more application class loaders delegate to the system class loader.

6. The method of claim 1, further comprising:
identifying said plug-in class loader that is provided for and delegates to said identified class loader.

7. The method of claim 1, wherein:
a particular one of said application classes is loaded by a particular class loader of said class loader hierarchy, and a first plug-in class associated with a first application class and a second plug-in class associated with a second application class are each specified to use the class loader of said particular application; and
said first plug-in class and said second plug-in class are both loaded by the plug-in class loader that is associated with and delegates to said particular class loader.

8. The method of claim 7, wherein said first plug-in class and said second plug-in class are able to share data.

9. An apparatus including a processor for selecting a class loader to load a plug-in class within a class loader hierarchy, the apparatus comprising:
means for generating a class loader hierarchy comprising a plurality of class loaders that includes two or more application class loaders, one for each of two or more application classes, wherein each of said application class loaders can selectively load its application class, or delegate the loading of its application class to another class loader of said class loader hierarchy;
means for providing a different plug-in class loader for each class loader of said class loader hierarchy, wherein each plug-in class loader is associated with only a single class loader of said hierarchy, and each plug-in class loader delegates to its associated class loader;
means for identifying the class loader of said hierarchy that is used to load a specified one of said two or more application classes;
means for configuring a first application class to load a first plug-in class using a target class, wherein the name of the target class is specified in a configuration file and the target class resides at a point at or below the application class in the application class loader hierarchy;
means for identifying a target class loader within the class loader hierarchy that loaded the target class;
means for identifying a plug-in class loader that is associated with and delegates to the target class loader; and
means for loading the first plug-in using the identified plug-in class loader.

10. The apparatus of claim 9, wherein the plurality of class loaders includes a boot class loader.

11. The apparatus of claim 10, wherein the plurality of class loaders includes an extension class loader, wherein the extension class loader delegates to the boot class loader.

12. The apparatus of claim 11, wherein the plurality of class loaders includes a system class loader, wherein the system class loader delegates to the extension class loader.

13. The apparatus of claim 12, wherein the two or more application class loaders delegate to the system class loader.

14. The apparatus of claim 9, further comprising:
means for identifying said plug-in class loader that is provided for and delegates to said identified class loader.

15. The apparatus of claim 9, further comprising:
means, responsive to a second application class loading a second plug-in class, for identifying the target class loader within the class loader hierarchy that loaded the target class;
means for identifying the plug-in class loader that is provided for and delegates to the target class loader; and
means for loading the second plug-in class using the plug-in class loader.

16. The apparatus of claim 15, wherein the first plug-in class and the second plug-in class share data.

17. A computer program product, in a recordable-type computer readable medium, for selecting a class loader to load a plug-in class within a class loader hierarchy, the computer program product comprising:
first instructions for generating a class loader hierarchy comprising a plurality of class loaders that includes two or more application class loaders, one for each of two or more application classes, wherein each of said application class loaders can selectively load its application class, or delegate the loading of its application class to another class loader of said class loader hierarchy;
second instructions for providing a different plug-in class loader for each class loader of said class loader hierarchy, wherein each plug-in class loader is associated with only a single class loader of said hierarchy, and each plug-in class loader delegates to its associated class loader; third instructions for identifying the class loader of said hierarchy that is used to load a specified one of said two or more application classes; and
fourth instructions for configuring a first application class to load a first plug-in class using a target class, wherein the name of the target class is specified in a configuration file and the target class resides at a point at or below the application class in the application class loader hierarchy;
fifth instructions for identifying a target class loader within the class loader hierarchy that loaded the target class, and identifying a plug-in class loader that is associated with and delegates to the target class loader; and
sixth instructions for loading the first plug-in using the identified plug-in class loader.

* * * * *